(12) United States Patent
Edler

(10) Patent No.: US 10,214,380 B2
(45) Date of Patent: Feb. 26, 2019

(54) BUCKET REEL DEVICE

(71) Applicant: Plews, Inc., Dixon, IL (US)

(72) Inventor: Edward M. Edler, Pearl City, IL (US)

(73) Assignee: Plews, Inc., Dixon, IL (US)

( * ) Notice: Subject to any disclaimer, the term of this patent is extended or adjusted under 35 U.S.C. 154(b) by 367 days.

(21) Appl. No.: 15/412,855

(22) Filed: Jan. 23, 2017

(65) Prior Publication Data

US 2018/0208428 A1   Jul. 26, 2018

(51) Int. Cl.
| B65H 57/02 | (2006.01) |
| B65H 75/40 | (2006.01) |
| B65H 75/44 | (2006.01) |
| H02G 11/02 | (2006.01) |

(52) U.S. Cl.
CPC ......... B65H 75/4494 (2013.01); B65H 57/02 (2013.01); B65H 75/40 (2013.01); B65H 75/4471 (2013.01); H02G 11/02 (2013.01)

(58) Field of Classification Search
CPC .... B65H 49/205; B65H 49/322; B65H 75/16; B65H 75/28; B65H 75/4471; B65H 75/4494; B65H 57/24
See application file for complete search history.

(56) References Cited

U.S. PATENT DOCUMENTS

| 1,942,388 | A |   | 1/1934 | Ash |
| 4,451,014 | A |   | 5/1984 | Kitt et al. |
| 4,591,110 | A |   | 5/1986 | Wirts et al. |
| D286,370  | S |   | 10/1986 | Wirst et al. |
| 5,103,977 | A |   | 4/1992 | Douglas |
| 5,587,862 | A |   | 12/1996 | Frank |
| 5,848,701 | A |   | 12/1998 | Riccabona |
| 5,915,641 | A | * | 6/1999 | Barberg ................. B65H 75/40 191/12.2 R |
| 6,056,226 | A |   | 5/2000 | Green |
| 6,145,781 | A | * | 11/2000 | Kawabe ................. B65D 85/04 242/132 |
| 7,293,734 | B1 |  | 11/2007 | Kantner |
| 8,052,078 | B2 | * | 11/2011 | DeLuca ............... B65H 49/322 242/170 |
| 8,662,300 | B1 |  | 3/2014 | Arena |

(Continued)

FOREIGN PATENT DOCUMENTS

WO   WO 9427904 A1 * 12/1994 ............ B65H 75/40

*Primary Examiner* — William E Dondero
(74) *Attorney, Agent, or Firm* — Bay Area Technology Law Group PC

(57) ABSTRACT

A device for the coiling, storage and payout of cable, hose, cord and wire having a bucket creating a storage space defined by a round bucket bottom, a peripheral wall cylindrically extending from the round bucket bottom and terminating in a round open top and a bucket longitudinal axis passing through its geometric center. A spool having a cylindrical core, spaced apart top and bottom flanges and a spool longitudinal axis passing through its geometric center. A nub extends between and spaces the bottom flange from the bucket bottom, the bucket further having an opening in its peripheral wall, the opening having elongated sides extending longitudinally and parallel to the bucket longitudinal axis and extending the distance between the top and bottom flanges and relatively low friction contour rails positioned along the elongated sides and an extendible handle secured to the top flange.

5 Claims, 4 Drawing Sheets

(56) References Cited

U.S. PATENT DOCUMENTS

| | | |
|---|---|---|
| 9,248,952 B2 | 2/2016 | Burrous et al. |
| 9,266,697 B2 | 2/2016 | Houston et al. |
| 2006/0124505 A1 | 6/2006 | Hanson |
| 2008/0023358 A1 | 1/2008 | Otto |
| 2012/0168554 A1 | 7/2012 | Blunt et al. |

* cited by examiner

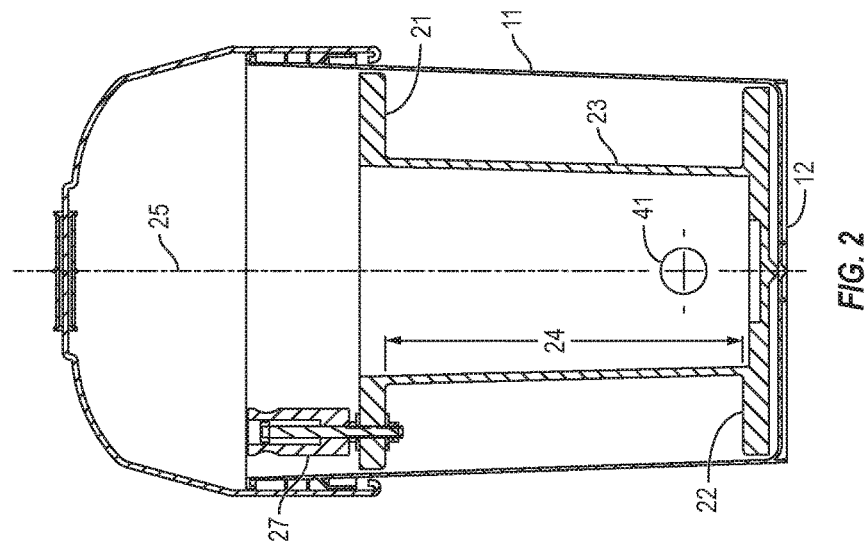
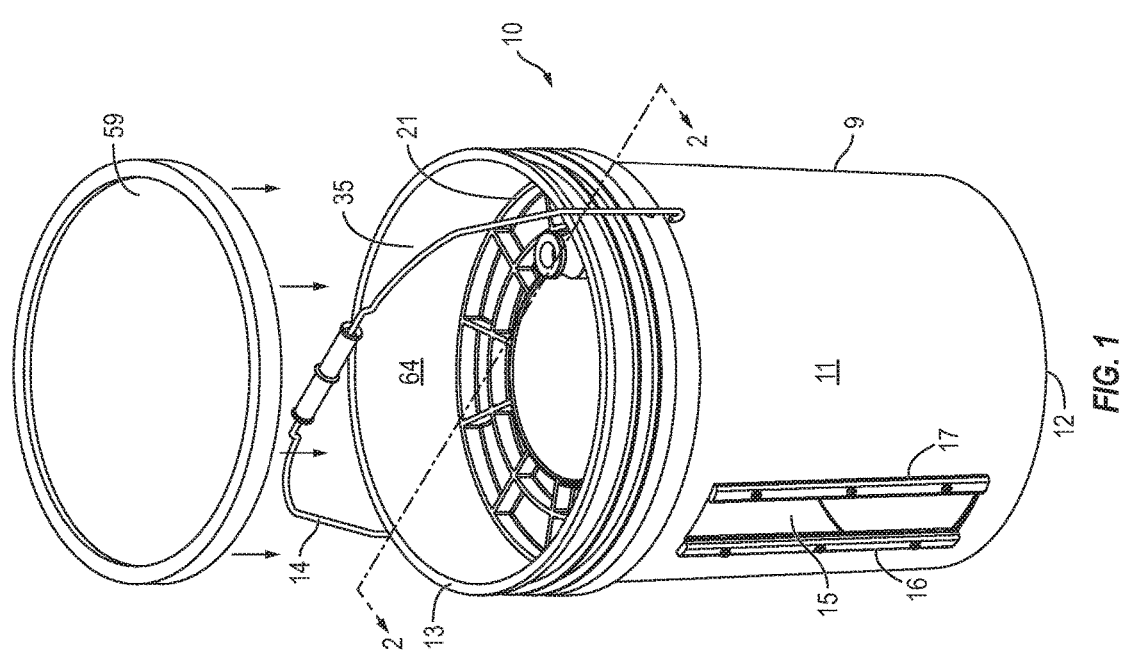

BUCKET REEL DEVICE

TECHNICAL FIELD

The present invention is directed to a device for the coiling, storage and payout of cable, hose, cord and wire in the form of a bucket containing a spool having a cylindrical core upon which the cable, hose, cord and wire are wound. An opening is created within the bucket peripheral wall for introducing and removing coiled elements from its interior, the opening having low friction contour rails while the bottom flange of the spool is spaced from the bottom of the bucket by a nub acting as a low friction interface in preventing the bottom flange of the spool from contacting the bottom of the bucket throughout the operation of the device.

BACKGROUND OF THE INVENTION

The transport and use of cables, hoses, cords and wires have been and continues to be a challenge to contractors, skilled professionals and even homeowners. When such products are wound on a reel, they are oftentimes difficult to lift and, quite often, inadvertently unravel and tangle particularly if they are consumed in piecemeal, taking a portion of the cable, hose, cord or wire from the reel while maintaining the remainder coiled for future use.

There have been a number of patents directed to the application of a reel housed in a bucket for piecemeal payout of coiled elements. The popularity of such items is not surprising for the bucket acts to retain the coiled elements within the confines of the bucket thus minimizing the potential for them to twist and tangle. Furthermore, buckets generally are provided with handles which facilitate their relatively easy transport from jobsite to jobsite. However, such products, to date, have proven to be less than ideal. As reels are required to rotate within the buckets retaining them, frictional contact between elements interferes with payout and coiling. Also, as openings must be configured within the bucket through which the cables, hoses, cords and wires must pass, the coiled elements tend to degrade as the openings tend to create knife-like edges.

Is thus an object of the present invention to provide a bucket reel for the transport of cables, hoses, cords and wires which is devoid of the shortcomings of similar devices of the prior art.

These and other objects will be more readily apparent when considering the following disclosure and appended claims.

SUMMARY OF THE INVENTION

A device for the coiling, storage and payout of cable, hose, cord and wire, said device comprising:
a bucket creating a storage space defined by a round bucket bottom, a peripheral wall cylindrically extending from said round bucket bottom and terminating in a round open top, said bucket further characterized as having a bucket longitudinal axis passing through its geometric center;
a spool comprising a substantially cylindrical core, spaced apart top and bottom flanges and a spool longitudinal axis passing through its geometric center;
a nub extending between said bottom flange and said bucket bottom at said spool and bucket longitudinal axes;
said bucket further comprising an opening in said peripheral wall sized to accommodate passage of said cable, hose, cord and wire, said opening having elongated sides extending longitudinally and substantially parallel to said bucket longitudinal axis extending approximately the distance between said top and bottom flanges and relatively low friction contour rails positioned along said elongated sides;
a handle secured to said top flange;
wherein when said spool is confined within said storage space, said bottom flange is spaced from said bucket bottom by said nub, said bucket longitudinal axis aligns with said spool longitudinal axis and said handle extends toward said round open top and when cable, hose, cord or wire is withdrawn from said cylindrical core through said opening, said bottom flange remains spaced from said bucket bottom by said nub.

BRIEF DESCRIPTION OF THE FIGURES

FIG. 1 is a perspective view of the bucket reel of the present invention.

FIG. 2 is a cross-section of the bucket reel of FIG. 1 taken along 2-2 thereof.

DETAILED DESCRIPTION OF THE INVENTION

Figure 3:
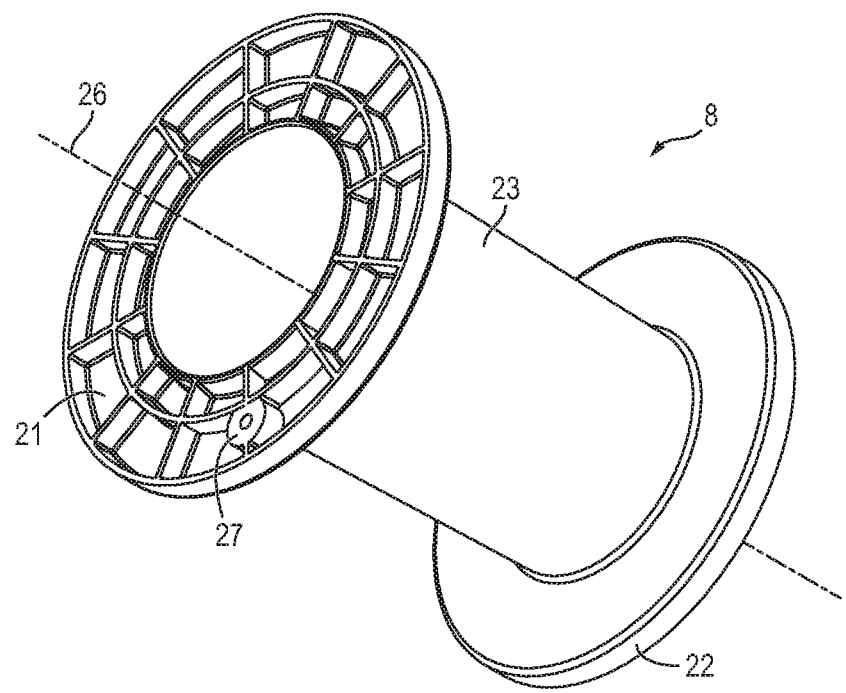
FIG. 3 is a perspective view of the spool constituting a portion of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

Reference is made to the appended figures providing an in-depth description of the present invention. Specifically, device 10 comprises bucket 9 establishing storage space 35 defined by round bucket bottom 12, peripheral side wall 11 cylindrically extending from round bucket bottom 12 and terminating in round open top 13. Bucket 9 is further defined by longitudinal axis 25 passing through its geometric center as shown.

A second component of the present invention is spool 8 (FIG. 3) comprising substantially cylindrical core 23, spaced apart top and bottom flanges 21 and 22, respectively, and also characterized by longitudinal axis 26 again passing through its geometric center.

Figure 5A:
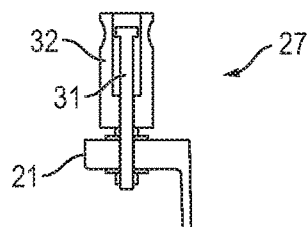
FIGS. 5A and 5B are cross-sectional views of the orientations of the handle constituting a portion of the present invention.
Figure 5B:
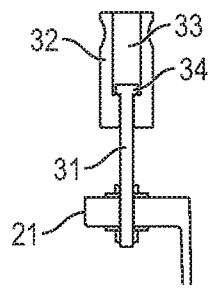
Figure 7:
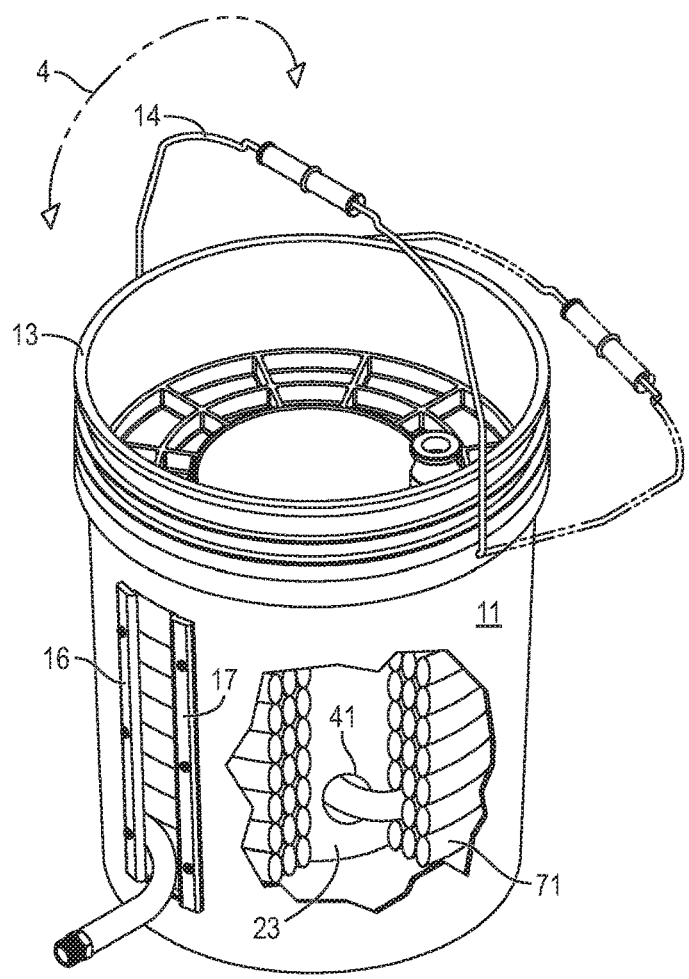
FIG. 7 is a perspective cutaway view of the bucket reel the present invention illustrating the winding of a hose upon it spool.
Figure 8:
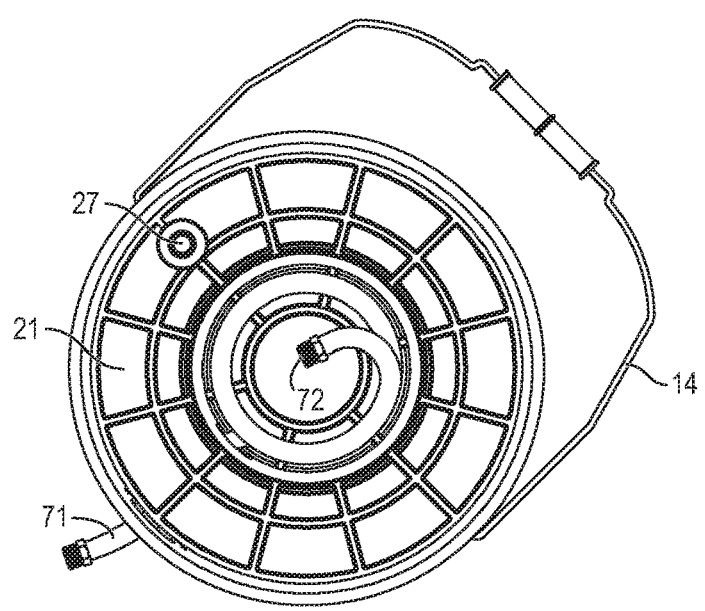
FIG. 8 is a top view of the bucket reel the present invention.

In employing the present invention as a device for the coiling, storage and payout of cable, hose, cord and wire, such coiled elements are to be wrapped about cylindrical core 23. In doing so, an end of suitable cable, hose, cord and wire is optionally introduced through opening 41 in cylindrical core 23 although an end of a coiled elements can simply be wrapped about cylindrical core 23 without introducing an end of it through opening 41 and into the interior space established by the cylindrical core. Handle 27, the details of which are provided in FIGS. 5A and 5B, is attached to top flange 21 by virtue of bolt 31. Handle body 32 includes axial opening 33, the size of which being greater than the body portion of bolt 31. However, head portion 34 of bolt 31 prevents handle body 32 from being completely removed from bolt 31 as illustrated in FIG. 5B. In so configuring handle 27, when not in use, handle body 32 will, through gravity, rest upon top flange 21 (FIG. 5A) in area 64 and below open top 13 thus enabling optional lid 59 to be unimpeded in fitting over open top 13. When a user wishes to wind cable, hose, cord or wire upon cylindrical core 23, handle 27 can be raised (FIG. 5B) facilitating rotation of spool 8 about longitudinal axis 26. A suitable example of the use of the present invention is illustrated in FIGS. 7 and 8 showing air hose 71 introduced to bucket reel 10 through opening 15 against contour rail 16, the benefits of which are described below. Air hose 71 wraps about cylindrical core 23, end 72 of which enters the interior of cylindrical core 23 through opening 41 causing end 72 to protrude within bucket reel 8.

Figure 6:
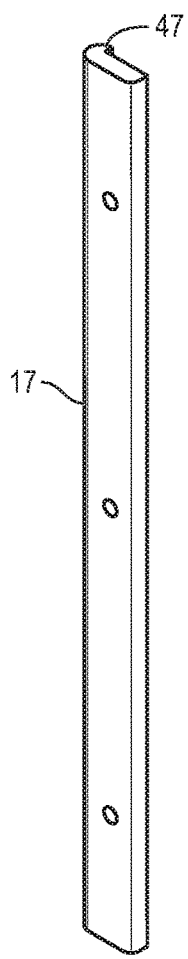
FIG. 6 is a perspective view of a low friction contour rail employed in the fabrication of the present invention.

Opening 15 is characterized as having elongated sides extending longitudinally and substantially parallel to bucket longitudinal axis 25, opening 15 extending approximately the distance 24 between top and bottom flanges 21 and 22 thus providing the appropriate passageway for coiled elements to wrap completely about cylindrical core 23. However, when cable, hose, cord or wire is introduced through opening 15 within a bucket which is usually composed of high density polyethylene (HDPE) and particularly when introduced at an acute angle to peripheral wall 11, the opening, in the sidewall not only acts as a frictional impediment but also can unduly abrade and thus compromise the integrity of the coiled elements particularly if a user experiences resistance during the coiling operation. To address this matter, the present invention is provided with low friction contour rails 16 and 17, ideally composed of acrylonitrile butadiene styrene (ABS) positioned along the elongated sides of opening 15 as shown in FIG. 1. As noted in reference to FIG. 6, contour rail 17 is characterized by lips 47 which wraps about an elongated side of opening 15 further facilitating the unimpeded introduction and removal of coiled elements from interior 35 of bucket 9.

Figure 4A:
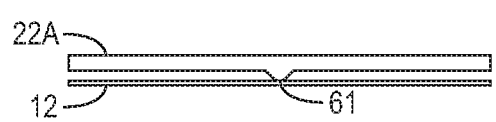
FIGS. 4A and 4B are cross-sectional views of alternative embodiments of the present invention.
Figure 4B:
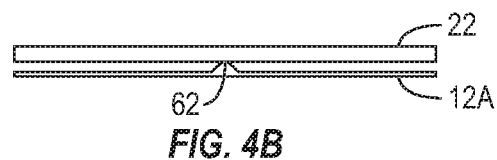

A critical feature of the present invention involves its creation of a low friction interface between bottom flange 22 and round bucket bottom 12. Prior devices of this kind generally rest the bottom flange of their spool directly onto the bucket bottom resulting in a high friction interface. Others have designed rather elaborate lazy Susan-like configurations in their attempt to reduce friction. However, such devices are expensive to fabricate and tend to foul when debris accumulates within the bucket. The present invention overcomes the limitations of the prior art by establishing a nub extending between bottom flange 22 and round bucket bottom 12 which distances bottom flange 22 from round bucket bottom 12 throughout the operation of the present device. As noted in reference to FIGS. 4A and 4B, the nub can extend from the bottom flange or can extend from the round bucket bottom. As shown, bottom flange 22A is spaced from bucket bottom 12 by extending nub 61 from the bottom flange. Alternatively, nub 62 can extend from bucket bottom 12A. As bucket longitudinal axis 25 and spool longitudinal axis 26 coincide when the spool is positioned within the bucket, nubs 61 and 62 align with both longitudinal axes. Ideally, top and bottom flanges 21 and 22 are sized with respect to storage space 35 and particularly the dimension of peripheral wall 11 such that when cable, hose, cord and wire are withdrawn from spool 8 through opening 15, no portion of bottom flange 22 comes into contact with round bucket bottom 12 by virtue of the spacing created by nub 61/62.

In operation, device 10, ideally in the form of bucket 9 is provided with typical bucket handle 14 which can be repositioned per arrows 4. Lid 59 fits over round open top 13 while handle 27 sits upon upper flange 21 (FIG. 5A). At the job site, lid 59 is removed and coiled elements can be withdrawn from interior 35 of bucket 9 by simply pulling them through opening 15 past low friction contour rails 16 and 17. When winding suitable cable, hose, cord and wire onto cylindrical core 23 of spool 8, handle 27 is raised (FIG. 5B) extending the handle above round open top 13 to facilitate rotation of spool 8.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

The invention claimed is:

1. A device for the coiling, storage and payout of cable, hose, cord and wire, said device comprising:
   a bucket comprising a storage space defined by a round bucket bottom, a peripheral wall cylindrically extending from said round bucket bottom and terminating in a round open top, said bucket further characterized as having a bucket longitudinal axis passing through its geometric center;

a spool comprising a substantially cylindrical core, spaced apart top and bottom flanges and a spool longitudinal axis passing through its geometric center;

a nub extending between said bottom flange and said bucket bottom at said spool and bucket longitudinal axes;

said bucket further comprising an opening in said peripheral wall sized to accommodate passage of said cable, hose, cord and wire, said opening having elongated sides extending longitudinally and substantially parallel to said bucket longitudinal axis extending approximately the distance between said top and bottom flanges and relatively low friction contour rails positioned along said elongated sides;

a handle secured to said top flange;

wherein when said spool is confined within said storage space, said bottom flange is spaced from said bucket bottom by said nub, said bucket longitudinal axis aligns with said spool longitudinal axis and said handle extends toward said round open top and when cable, hose, cord or wire is withdrawn from said cylindrical core through said opening, said bottom flange remains spaced from said bucket bottom by said nub wherein said top and bottom flanges are sized with respect to said storage space such that when said cable, hose, cord and wire are withdrawn from said spool through said opening in said peripheral wall, no portion of said bottom flange comes into contact with said round bucket bottom.

2. The device of claim 1 wherein when said spool is confined within said storage space, said handle extends approximately no further than said round open top when stored and is configured to extend above the said round open top when in use.

3. The device of claim 2 further comprising a bucket lid for fitting over said round open top, said handle being beneath said bucket lid when stored, a portion of said handle extending above said round open top upon removal of said bucket lid.

4. The device of claim 1 wherein cylindrical core is provided with an opening for receiving an end of said cable, hose, cord and wire.

5. The device of claim 1 further comprising a bucket handle secured to said peripheral wall to facilitate the carrying of said device.

* * * * *